(12) United States Patent
Rathore

(10) Patent No.: US 11,812,193 B2
(45) Date of Patent: Nov. 7, 2023

(54) DECOUPLING LINK TRAINING FOR A VIDEO SOURCE AND VIDEO SINK IN AN EXTENSION ENVIRONMENT

(71) Applicant: Icron Technologies Corporation, Burnaby (CA)

(72) Inventor: Bhupinder Singh Rathore, Coquitlam (CA)

(73) Assignee: Icron Technologies Corporation, Burnaby (CA)

( * ) Notice: Subject to any disclaimer, the term of this patent is extended or adjusted under 35 U.S.C. 154(b) by 145 days.

(21) Appl. No.: 17/384,549

(22) Filed: Jul. 23, 2021

(65) Prior Publication Data

US 2022/0030194 A1  Jan. 27, 2022

Related U.S. Application Data

(60) Provisional application No. 63/057,152, filed on Jul. 27, 2020.

(51) Int. Cl.
  *H04N 7/10* (2006.01)
  *H04N 5/44* (2011.01)
(52) U.S. Cl.
  CPC ................. *H04N 7/10* (2013.01); *H04N 5/44* (2013.01)

(58) Field of Classification Search
  None
  See application file for complete search history.

(56) References Cited

U.S. PATENT DOCUMENTS

| 8,380,912 | B2 | 2/2013 | Jaramillo |
| 10,474,614 | B2 | 11/2019 | Kambhatla |
| 2018/0137833 | A1* | 5/2018 | Hundal ................. G09G 5/006 |

* cited by examiner

*Primary Examiner* — Samira Monshi
(74) *Attorney, Agent, or Firm* — CHRISTENSEN O'CONNOR JOHNSON KINDNESS PLLC

(57) ABSTRACT

In some embodiments, a system for providing DisplayPort communication over an extension medium is provided. The system comprises an upstream facing port device (UFP device) and a downstream facing port device (DFP device). The UFP device is configured to conduct link training with a DisplayPort source device using first DisplayPort configuration data (DPCD). The DFP device is configured to conduct link training with the DisplayPort sink device using second DPCD different from the first DPCD. The UFP device is configured to extract video data from DisplayPort data received from the DisplayPort source device and transmit the video data to the DFP device. The DFP device is configured to receive the video data, generate DisplayPort data as specified by the second DPCD, and transmit the generated DisplayPort data to the DisplayPort sink device as specified by the second DPCD.

20 Claims, 6 Drawing Sheets

DECOUPLING LINK TRAINING FOR A VIDEO SOURCE AND VIDEO SINK IN AN EXTENSION ENVIRONMENT

CROSS REFERENCE TO RELATED APPLICATION

This application claims the benefit of Provisional Application No. 63/057,152, filed Jul. 27, 2020, the entire disclosure of which is hereby incorporated by reference herein for all purposes.

BACKGROUND

DisplayPort communication is described in detail at least in "VESA DisplayPort Standard, Version 1.4," released on Mar. 1, 2016, by VESA. This document, the content of which is known to one of ordinary skill in the art, is hereby incorporated by reference herein in its entirety, along with any earlier versions or related documents mentioned therein (collectively hereinafter "the DisplayPort specification"), for all purposes. The DisplayPort specification describes physical and logical techniques for communication between a DisplayPort source device which generates video (and, in some embodiments, audio) and a DisplayPort sink device which presents the video (and, in some embodiments, audio). The DisplayPort specification also describes topologies wherein one or more branch devices (which are similar to repeaters, splitters, or hubs) are present between the DisplayPort source device and the DisplayPort sink device.

The DisplayPort specification includes some limits on the length of a cable connecting the DisplayPort source device and the DisplayPort sink device, and also includes other specific requirements for the physical construction of the cable. For example, full bandwidth transmission over a passive cable is limited to a cable length of three meters. Further, the DisplayPort specification describes direct communication between the DisplayPort source device and the DisplayPort sink device, but does not allow any manipulation of the video or audio content between the DisplayPort source device and the DisplayPort sink device. The DisplayPort specification also assumes that a link is established directly between a given DisplayPort source device and a given DisplayPort sink device, and therefore also assumes that a single communication format is used between the DisplayPort source device and the DisplayPort sink device.

What is desired are devices and techniques that allow DisplayPort source and sink devices that otherwise comply with the DisplayPort specifications to communicate over an extension medium despite the transmission distance limits and media requirements of the DisplayPort specifications.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a system for providing DisplayPort communication over an extension medium is provided. The system comprises an extension medium; an upstream facing port device (UFP device), and a downstream facing port device (DFP device). The UFP device is communicatively coupled to a DisplayPort source device and the extension medium. The DFP device is communicatively coupled to a DisplayPort sink device and the extension medium. The UFP device is configured to conduct link training with the DisplayPort source device using first DisplayPort Configuration Data (DPCD), wherein the first DPCD is associated with the DisplayPort source device; receive DisplayPort data from the DisplayPort source device as specified by the first DPCD; extract video data from the DisplayPort data received from the DisplayPort source device; and transmit the video data to the DFP device via the extension medium. The DFP device is configured to conduct link training with the DisplayPort sink device using second DisplayPort configuration data (DPCD), wherein the second DPCD is associated with the DisplayPort sink device; receive the video data from the UFP device; generate DisplayPort data as specified by the second DPCD, wherein the generated DisplayPort data includes the video data; and transmit the generated DisplayPort data to the DisplayPort sink device as specified by the second DPCD. The first DPCD is different from the second DPCD.

In some embodiments, a downstream facing port device (DFP device) is provided. The DFP device comprises a first interface, a second interface, and logic. The first interface is configured to be communicatively coupled to an extension medium. The second interface is configured to be communicatively coupled to a DisplayPort sink device. The logic, in response to execution by the DFP device, causes the DFP device to perform actions comprising conducting link training with the DisplayPort sink device using first DisplayPort configuration data (DPCD), wherein the first DPCD is associated with the DisplayPort sink device; receiving video data via the first interface, wherein the video data is extracted from DisplayPort data received by an upstream facing port device (UFP device) over a link trained using second DisplayPort configuration data (DPCD); generating DisplayPort data as specified by the first DPCD, wherein the generated DisplayPort data includes the video data; and transmitting the DisplayPort data to the DisplayPort sink device as specified by the first DPCD. The first DPCD is different from the second DPCD.

In some embodiments, a non-transitory computer-readable medium having computer-executable instructions stored thereon is provided. The instructions, in response to execution by a downstream facing port device (DFP device), cause the DFP device to perform actions comprising conducting link training with the DisplayPort sink device using first DisplayPort configuration data (DPCD), wherein the first DPCD is associated with the DisplayPort sink device; receiving video data from an extension interface, wherein the video data is extracted from DisplayPort data received by an upstream facing port device (UFP device) over a link trained using second DisplayPort configuration data (DPCD); generating DisplayPort data as specified by the first DPCD, wherein the generated DisplayPort data includes the video data; and transmitting the DisplayPort data to the DisplayPort sink device as specified by the first DPCD. The first DPCD is different from the second DPCD.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

In some embodiments of the present disclosure, extension devices such as upstream facing port devices (UFP devices) and downstream facing port devices (DFP devices) connect via an extension medium such as a network. UFP devices form DisplayPort connections to DisplayPort source devices, and DFP devices form DisplayPort connections to DisplayPort sink devices. When a UFP device and a DFP device pair with each other, DisplayPort video and/or audio information from the DisplayPort source device can be presented by the DisplayPort sink device which are coupled to the UFP device and DFP device, respectively. In some embodiments of the present disclosure, the UFP device may train a DisplayPort link between the UFP device and a DisplayPort source device using first DisplayPort configuration data (DPCD) associated with the DisplayPort source device, and the DFP device may train a DisplayPort link between the DFP device and a DisplayPort sink device using different second DPCD associated with the DisplayPort sink device. The UFP device may extract video data from DisplayPort data received from the DisplayPort source device according to the first DPCD and transmit the video data to the DFP device via the extension medium. The DFP device may, in turn, receive the video data via the extension medium, create DisplayPort data that includes the video data according to the second DPCD, and transmit the DisplayPort data to the DisplayPort sink device according to the second DPCD. The first DPCD may be different from the second DPCD in one or more ways.

Figure 1A:
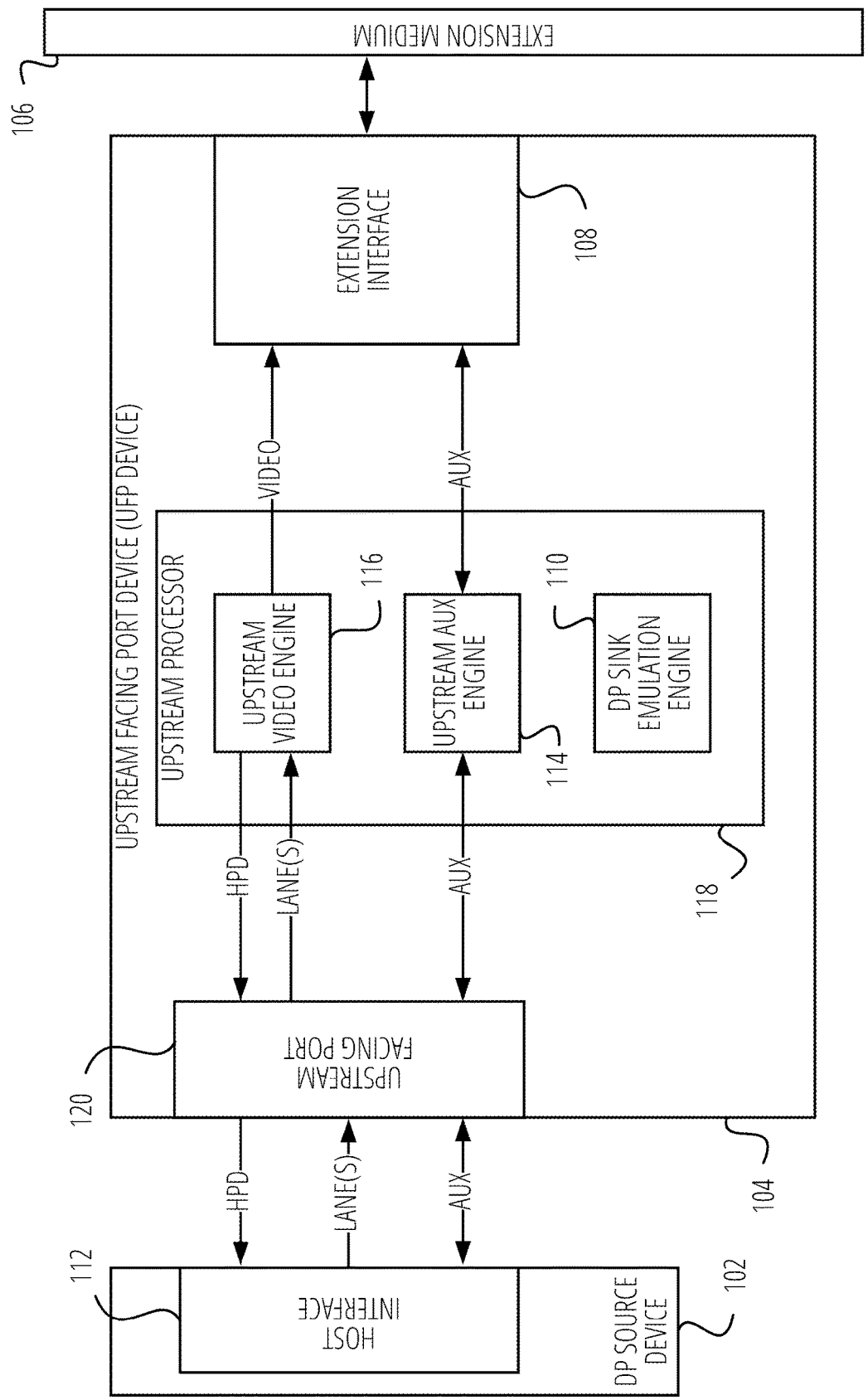
FIG. 1A and FIG. 1B are block diagrams that respectively illustrate non-limiting example embodiments of an upstream facing port device (UFP device) and a downstream facing port device (DFP device) according to various aspects of the present disclosure.
Figure 1B:
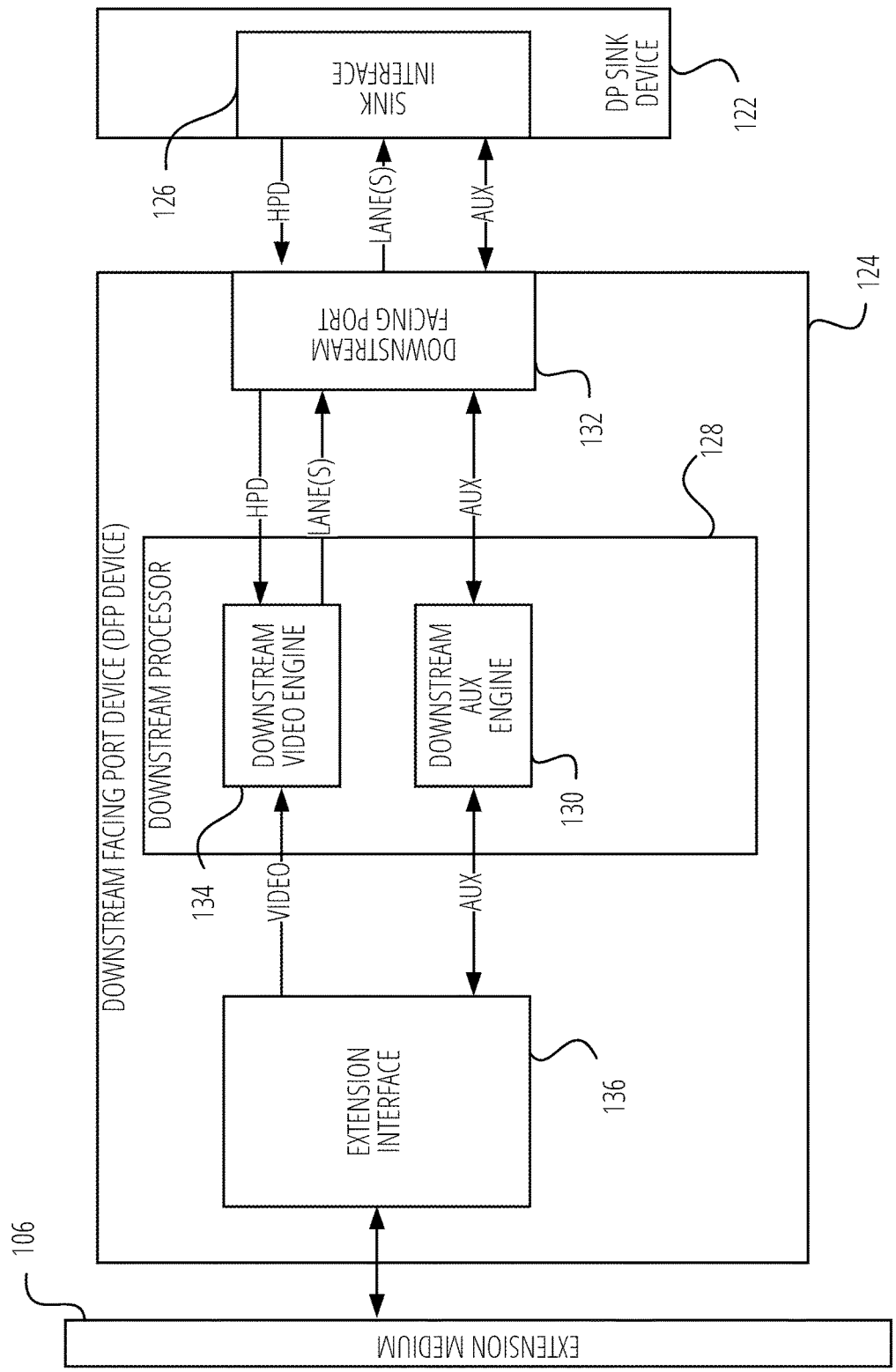

FIGS. 1A and 1B are block diagrams that respectively illustrate non-limiting example embodiments of an upstream facing port device (UFP device) and a downstream facing port device (DFP device) according to various aspects of the present disclosure. In FIG. 1A, a DisplayPort source device (DP source device 102), an upstream facing port device (UFP device 104), and an extension medium 106 are illustrated. The DP source device 102 may be any type of device capable of transmitting DisplayPort information, including but not limited to a desktop computing device, a laptop computing device, a tablet computing device, a rack-mount computing device, an external graphics card, a video processing system, and/or the like.

The DP source device 102 includes a host interface 112, which is communicatively coupled to an upstream facing port 120 of the UFP device 104. In some embodiments, the host interface 112 and the upstream facing port 120 may include DisplayPort connectors. In some embodiments, the host interface 112 and the upstream facing port 120 may include connectors defined by another standard that are usable to communicate via DisplayPort, including but not limited to USB Type-C connectors and/or DockPort connectors. The connection between the DP source device 102 and the UFP device 104 via the host interface 112 and upstream facing port 120 may include a cable and other hardware as described in the DisplayPort specifications (or interoperable with such specifications) and as known to one of ordinary skill in the art.

As illustrated, the UFP device 104 includes an upstream processor 118. In some embodiments, the upstream processor 118 may be implemented using a field-programmable gate array (FPGA), an application-specific integrated circuit (ASIC), a microcontroller, and/or any other suitable type of computing device or integrated circuit. The upstream processor 118 may be configured to provide an upstream video engine 116, an upstream AUX engine 114, and a DP sink emulation engine 110.

In general, the word "engine," as used herein, refers to logic embodied in hardware, or software instructions which can be written in a programming language, such as C, C++, C # COBOL, JAVA™, PHP, Perl, HTML, CSS, JavaScript, VBScript, ASPX, Go, and/or the like. An engine embodied in hardware may be designed using a hardware description language (HDL). A software engine may be compiled into executable programs or written in interpreted programming languages. Engines may be callable from other engines or from themselves. Generally, the engines described herein refer to logical modules that can be merged with other engines, or can be divided into sub-engines. The engines can be stored in any type of computer-readable medium or computer storage device and be stored on and executed by one or more general purpose computers, thus creating a special purpose computer configured to provide the engine or application. The engines may also be implemented using a floating point gate array (FPGA), an application-specific integrated circuit (ASIC), a microcontroller, or any other suitable type of integrated circuit computing device.

In some embodiments, the upstream video engine 116 is configured to receive one or more DisplayPort lanes from the upstream facing port 120. The upstream video engine 116 is configured to recover the video and/or audio signals from the DisplayPort lanes, and to provide the video and/or audio signals to the extension interface 108. In some embodiments, the upstream video engine 116 may configurably perform further processing on the video and/or audio before providing it to the extension interface 108, including but not limited to changing a bit rate of the information, encrypting the information, upsampling or downsampling the information, and/or any other type of processing. In some embodiments, the upstream video engine 116 is also configured to selectively provide a hot plug detect (HPD) signal to the DP source device 102 via the upstream facing port 120. The upstream video engine 116 may selectively provide the HPD signal based on instructions received from the upstream AUX engine 114, the DP sink emulation engine 110, or other components of the UFP device 104. Further illustration and description of an exemplary embodiment of an upstream video engine 116 is provided in FIG. 2 and the accompanying text.

In some embodiments, the upstream AUX engine 114 is configured to manage AUX channel communication with the DP source device 102 and to control the selective presentation of the HPD signal by the upstream video engine 116. The upstream AUX engine 114 and the upstream video engine 116 may also be configured to conduct link training with the DP source device 102. One of the technical challenges of extending DisplayPort communication across the extension medium 106 is that the UFP device 104 may be unaware of the presence, configuration, or capabilities of the DFP device 124 or the DP sink device 122 upon connection of the DP source device 102 to the upstream facing port 120. Further, the UFP device 104 may wish to establish a DisplayPort link with the DP source device 102 at a highest supported bandwidth between the DP source device 102 and the UFP device 104, regardless of a capability of the DP sink device 122. Accordingly, the upstream AUX engine 114 manipulates the information communicated via the AUX channel and the HPD signal in order to overcome these challenges.

Another technical challenge that arises in implementing a connection over an extension medium 106 is that once link training is conducted with the DP source device 102, the DisplayPort link between the DP source device 102 and the UFP device 104 should be kept alive whether or not the UFP device 104 is paired to a DFP device 124, and regardless of a state of a DisplayPort link between the DFP device 124 and the DP sink device 122. Accordingly, in some embodiments the DP sink emulation engine 110 is configured provide information to the upstream video engine 116 in place of information that would normally be generated by the DP sink device 122 in response to signals provided by the DP source device 102 to keep the link alive. In this way, the UFP device 104 can train and maintain a DisplayPort link with the DP source device 102, and the DP source device 102 will not detect any changes even when communication between the UFP device 104 and the DFP device 124 or between the DFP device 124 and the DP sink device 122 is unstable or not yet established. Further details regarding some example techniques used by the upstream AUX engine 114, the upstream video engine 116, and the DP sink emulation engine 110 to provide this functionality are provided below.

In some embodiments, the upstream video engine 116 and the upstream AUX engine 114 communicate video/audio and AUX information with the DFP device 124 over the extension medium 106 via an extension interface 108. In some embodiments, the extension medium 106 and communication thereon may include any suitable networking technology, such as Ethernet, Bluetooth, WiFi, WiMax, the Internet, serial communication, and/or the like, and any suitable communication medium, such as via physical cables, via wireless spectrum, via fiber-optic cable, and/or the like. In some embodiments, the UFP device 104 and the DFP device 124 may happen to be closer to each other than the maximum distances specified in the DisplayPort specifications, but may nevertheless communicate via the extension medium 106. In some embodiments, the extension interface 108 is configured to provide a physical layer connection and logic that allows communication over the extension medium 106. Further illustration and description of an exemplary embodiment of an extension interface 108 is provided in FIG. 4 and the accompanying text.

In FIG. 1B, a DisplayPort sink device (DP sink device 122), a downstream facing port device (DFP device 124), and the extension medium 106 are illustrated. The DP sink device 122 may be any type of device capable of acting as a DisplayPort sink as described in the DisplayPort specification. Some non-limiting examples of a DP sink device 122 include liquid crystal display (LCD) monitors, projectors, large-format screens, video processing systems, and/or the like. The DP sink device 122 includes a sink interface 126, which is communicatively coupled to a downstream facing port 132 of the DFP device 124 using a cable or other connector. As with the connection between the DP source device 102 and the UFP device 104, the cable connecting the DFP device 124 and DP sink device 122 (as well as the downstream facing port 132 and the sink interface 126) may include standard DisplayPort receptacles, plugs, conductors, and the like, as described in the DisplayPort specifications and as known to one of ordinary skill in the art, or other types of receptacles, plugs, conductors, and the like which are capable of communicating DisplayPort information (including but not limited to USB Type-C connectors and DockPort connectors).

In some embodiments, the DFP device 124 includes a downstream processor 128. As with the upstream processor 118, the downstream processor 128 and/or its components may be implemented using an FPGA, an ASIC, a microcontroller, and/or any other suitable type of computing device or integrated circuit. In some embodiments, the downstream processor 128 provides a downstream video engine 134 and a downstream AUX engine 130.

In some embodiments, the downstream video engine 134 is configured to receive video and/or audio signals from the extension interface 136 and to generate one or more DisplayPort lanes based on the video and/or audio signals. The downstream video engine 134 is configured to provide the DisplayPort lanes to the DP sink device 122 via the downstream facing port 132. The downstream video engine 134 may also be configured to receive and detect the HPD signal transmitted by the DP sink device 122 via the sink interface 126. Further illustration and description of an exemplary embodiment of a downstream video engine 134 is provided in FIG. 3 and the accompanying text.

In some embodiments, the downstream AUX engine 130 is configured to manage AUX channel communication with the DP sink device 122. This may include determining the capabilities of the DP sink device 122, such that a maximum possible bandwidth or other quality of connection is determined. The downstream AUX engine 130 and the downstream video engine 134 may also be configured to conduct link training with the DP sink device 122. In some embodiments, link training may be conducted by the downstream AUX engine 130 and downstream video engine 134 in order to establish a highest-possible bandwidth link between the DFP device 124 and the DP sink device 122 based on the capabilities reported by the DP sink device 122. Further details regarding some example techniques used by the downstream AUX engine 130 and the downstream video engine 134 to provide this functionality are provided below.

In some embodiments, the downstream video engine 134 and the downstream AUX engine 130 communicate with the upstream video engine 116 and the upstream AUX engine 114 via the extension medium 106 using the extension interface 136. The extension medium 106 was described above, and the extension interface 136 is also similar to the extension interface 108 illustrated in FIG. 1A (though operating in reverse). Further illustration and description of an exemplary embodiment of an extension interface 136 is provided in FIG. 4 and the accompanying text.

Figure 2:
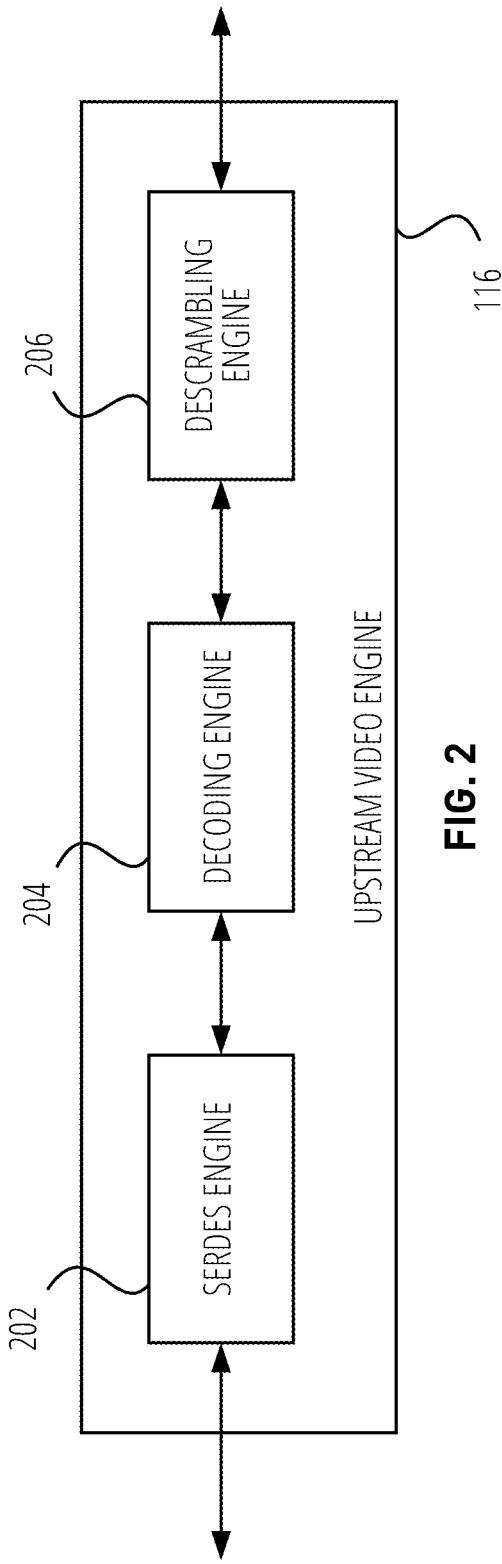
FIG. 2 is a block diagram that illustrates a non-limiting example embodiment of an upstream video engine according to various aspects of the present disclosure

FIG. 2 is a block diagram that illustrates a non-limiting example embodiment of an upstream video engine according to various aspects of the present disclosure. As illustrated, the upstream video engine 116 includes a SERDES engine 202, a decoding engine 204, and a descrambling engine 206. The SERDES engine 202, or serializer/deserializer engine, is configured to deserialize parallel data streams that have been received via the upstream facing port 120 in a serial format. The received data streams may include one or more scrambled and encoded video data streams. The received signals may also include AUX channel data, audio data, and/or other types of data.

The decoding engine 204 is configured to decode the encoded signals received from the SERDES engine 202. The decoding algorithm to be used may be specified via AUX channel communication, such that the decoding engine 204 can be configured to use a decoding technique that matches the incoming data. Some non-limiting examples of encoding formats include 8b/10b encoding, Display Stream Compression (DSC) encoding, and the like. The descrambling engine 206 is configured to descramble the decoded video signals generated by the decoding engine 204. Techniques for descrambling are described in the DisplayPort specifications. The output of the descrambling engine 206 (and therefore the upstream video engine 116) is a video signal suitable for presentation by a video presentation device or suitable for further video processing. An H.264 stream is one non-limiting example of the output, though other suitable video formats may be used. In some embodiments, the output of the upstream video engine 116 may include audio information and/or AUX channel information as well.

In some embodiments, the illustrated components of the upstream video engine 116 may be combined with each other, or individual components may be split into multiple components. Some other example components suitable for use in the upstream video engine 116 are described in the descriptions in the DisplayPort specifications of components for providing a main link.

Figure 3:
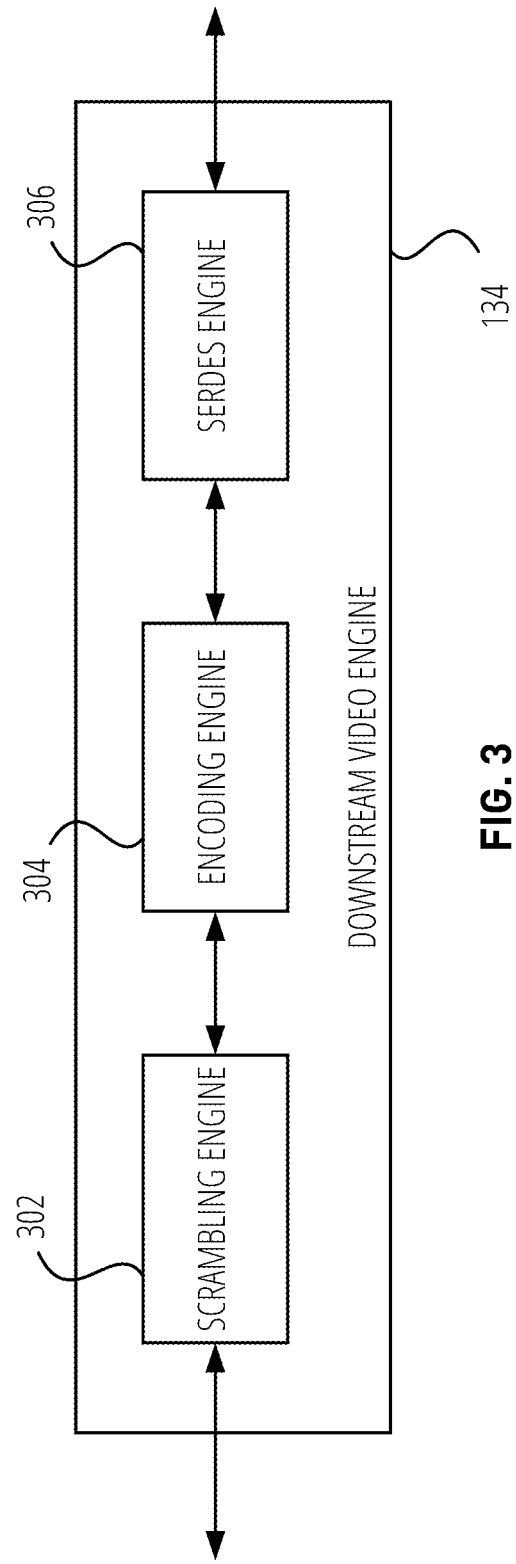
FIG. 3 is a block diagram that illustrates a non-limiting example embodiment of a downstream video engine according to various aspects of the present disclosure.

FIG. 3 is a block diagram that illustrates a non-limiting example embodiment of a downstream video engine according to various aspects of the present disclosure. In some embodiments, the downstream video engine 134 provides the inverse of the functionality of the upstream video engine 116. That is, the downstream video engine 134 may receive video and audio signals suitable for presentation, and may transmit DisplayPort data. As illustrated, the downstream video engine 134 includes a scrambling engine 302, an encoding engine 304, and a SERDES engine 306. The scrambling engine 302 receives the video and/or audio signals and scrambles them using any suitable technique, including but not limited to the techniques described in the DisplayPort specification. The encoding engine 304 receives the scrambled video and/or audio signals from the scrambling engine 302 and encodes them using any suitable technique, including but not limited to 8b/10b encoding, DSC encoding, and/or the like. The SERDES engine 306 then joins multiple scrambled and encoded data streams into a single serialized signal for transmission. As with the components of the upstream video engine 116, the components of the downstream video engine 134 may be combined or split apart, and both the functionality and the structure are similar to the main link described in the DisplayPort specifications.

Figure 4:
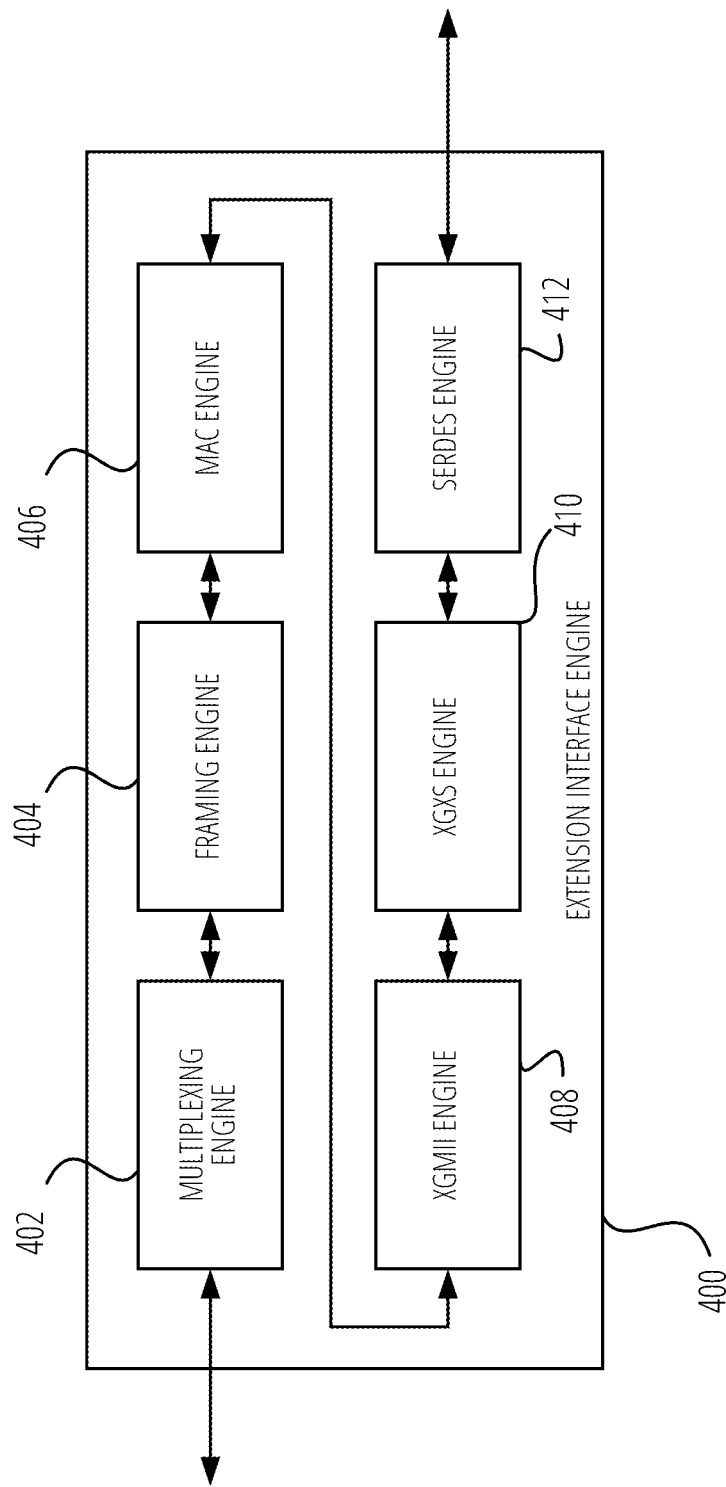
FIG. 4 is a block diagram that illustrates a non-limiting example embodiment of an extension interface engine according to various aspects of the present disclosure.

FIG. 4 is a block diagram that illustrates a non-limiting example embodiment of an extension interface engine according to various aspects of the present disclosure. A primary purpose of the extension interface engine 400, when on the UFP device 104, is to transmit the video, audio, and/or AUX signals over the extension medium 106 in an extension format. When on the DFP device 124, a primary purpose of the extension interface engine 400 is to receive extension format information from the extension medium 106 and convert it back into the original video, audio, and/or AUX signals. The extension interface engine 400 may also communicate information bi-directionally, and may be used for conducting a connection handshake between the UFP device 104 and the DFP device 124.

As illustrated, the extension interface engine 400 includes a multiplexing engine 402, a framing engine 404, a media access control engine (MAC engine 406), a 10-gigabit media-independent interface engine (XGMII engine 408), an XGMII extender sublayer engine (XGXS engine 410), and a SERDES engine 412. Obtaining, implementing, and/or integrating each of these components with each other to form the extension interface engine 400 is within the knowledge of one of ordinary skill in the art, and so is not described in detail. The extension interface engine 400 as illustrated is configured to use gigabit Ethernet as the extension medium 106. In some embodiments, an extension medium 106 may be used, and so the components of the extension interface engine 400 would be selected as appropriate for use with the different extension medium.

Figure 5A:
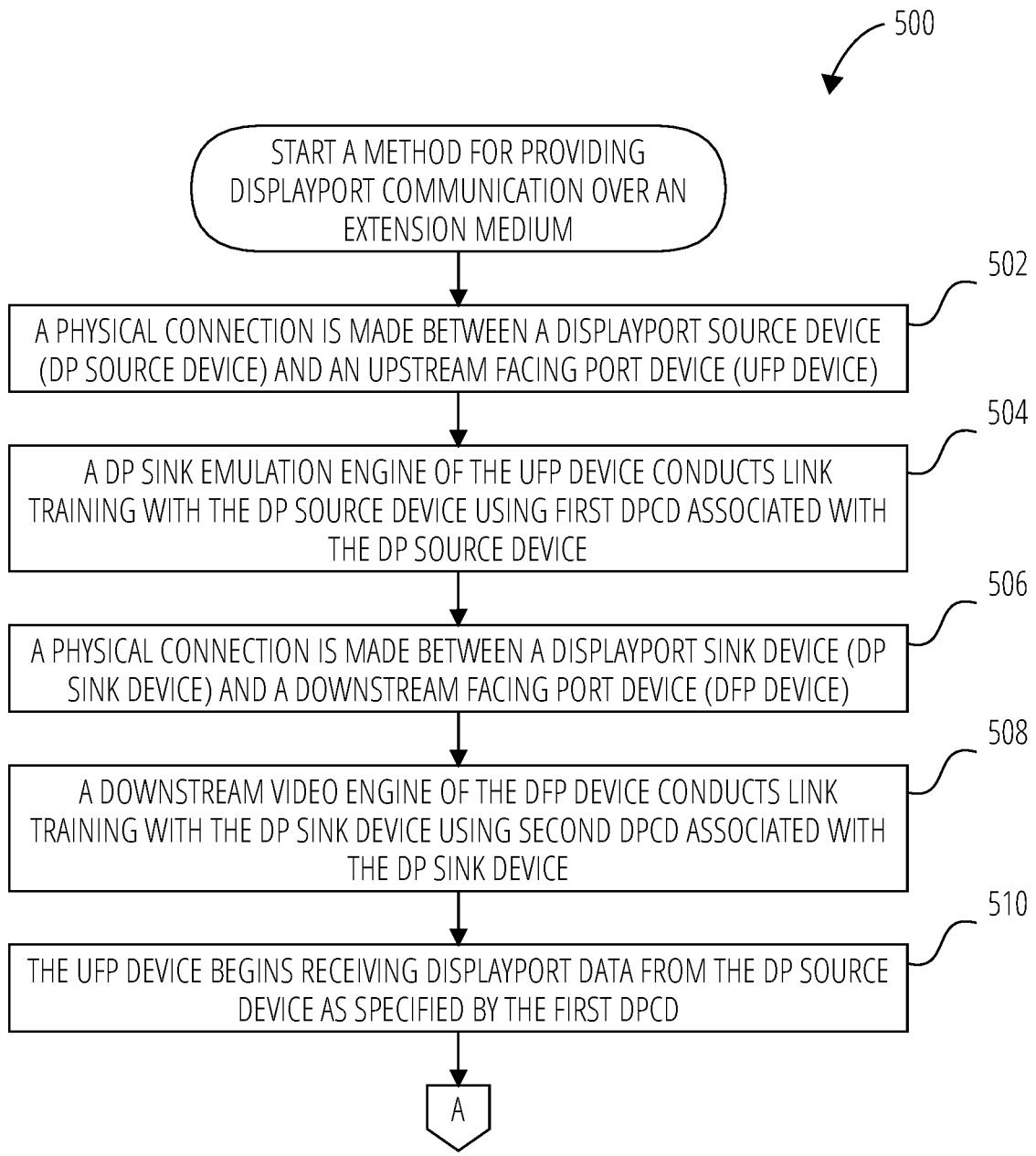
FIG. 5A and FIG. 5B are a flowchart that illustrates a non-limiting example embodiment of a method of establishing DisplayPort communication over an extension medium according to various aspects of the present disclosure.
Figure 5B:
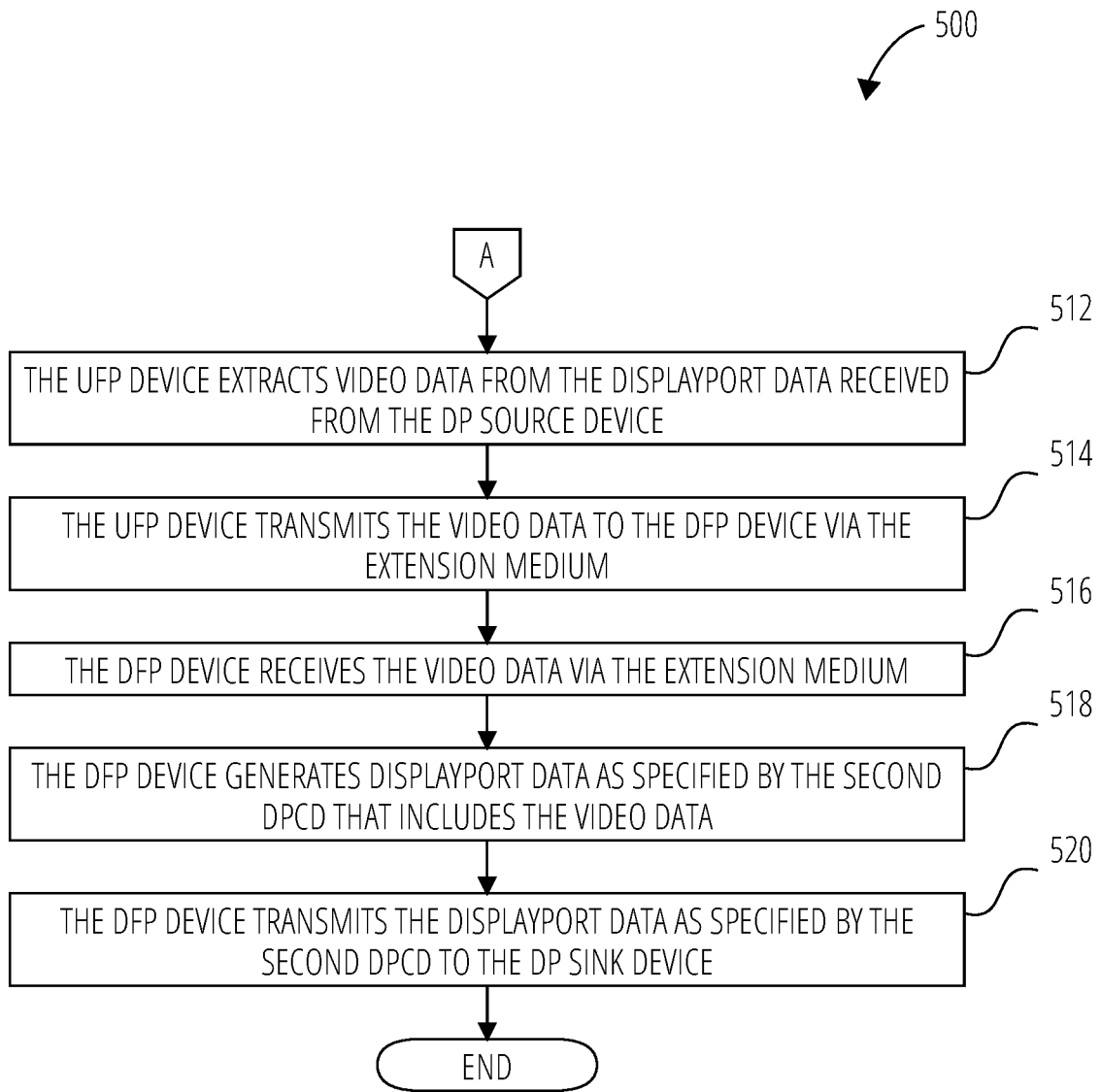

FIG. 5A and FIG. 5B are a flowchart that illustrates a non-limiting example embodiment of a method for providing DisplayPort communication over an extension medium according to various aspects of the present disclosure. In the method 500, the UFP device 104 and the DFP device 124 train separate links with the DP source device 102 and the DP sink device 122, respectively. These links may be configured according to mismatched DisplayPort configuration data (DPCD), and the UFP device 104 and DFP device 124 may compensate for the mismatches. The description below of the method 500 describes embodiments wherein the processed DisplayPort data includes video data, but does not include audio data, in order to improve the clarity of the description. This should not be seen as limiting, however: in some embodiments, the method 500 may be used to process DisplayPort data that includes both video data and audio data, or DisplayPort data that includes only audio data, or DisplayPort data that includes data streams other than or in addition to video data and/or audio data.

From a start block, the method 500 proceeds to block 502, where a physical connection is made between a DP source device 102 and a UFP device 104. The physical connection between the DP source device 102 and the UFP device 104 may be formed by attaching a cable that supports a DisplayPort standard between the host interface 112 and the upstream facing port 120 as described above.

At block 504, a DP sink emulation engine 110 of the UFP device 104 conducts link training with the DP source device 102 using first DisplayPort configuration data (DPCD) associated with the DP source device 102. The upstream video engine 116 and the upstream AUX engine 114 may also take part in the link training process. In some embodiments, the DP sink emulation engine 110 may generate EDID messages, DPCD messages, and/or DisplayID messages to be transmitted by the upstream AUX engine 114 to emulate the presence of a DisplayPort sink. Otherwise, link training between the DP source device 102 and the UFP device 104 may occur substantially as described in the DisplayPort specification. The first DPCD may specify one or more of a DPCD version, a max link rate value, a max lane count value, a post-link training adjustment value, a TPS3 support value, an enhanced frame cap value, a max downspread value, a TPS4 support value, and/or other values as described in section 2.9.3.2 of the DisplayPort specification.

In some embodiments, the DP sink emulation engine 110 uses the DPCD to train the link between the DP source device 102 and the UFP device 104 to have the highest possible quality supported by the DP source device 102, the UFP device 104, the extension medium 106, or the combination thereof. In some embodiments, the DP sink emulation engine 110 may cause the link to be trained at a maximum bandwidth, bit depth, refresh rate, resolution, and/or timing supported by the DP source device 102.

At block 506, a physical connection is made between a DP sink device 122 and a DFP device 124. As with the physical connection between the DP source device 102 and the UFP device 104, the physical connection between the DP sink device 122 and the DFP device 124 may be formed by attaching a cable that supports a DisplayPort standard between the downstream facing port 132 and the sink interface 126 as described above.

At block 508, a downstream video engine 134 of the DFP device 124 conducts link training with the DP sink device 122 using second DPCD associated with the DP sink device 122. In some embodiments, the downstream AUX engine 130 may also take part in the link training process. In some embodiments, the downstream video engine 134 may request EDID, DPCD, and/or DisplayID information from the DP sink device 122, and may train the link between the DFP device 124 and the DP sink device 122 at the maximum bandwidth, highest resolution, highest bit depth, highest refresh rate, and/or fastest timing supported by the DP sink device 122, the physical connection, the DFP device 124, the extension medium 106, and/or the combination thereof. As with the first DPCD, the second DPCD may specify one or more of a DPCD version, a max link rate value, a max lane count value, a post-link training adjustment value, a TPS3 support value, an enhanced frame cap value, a max downspread value, a TPS4 support value, and/or other values as described in section 2.9.3.2 of the DisplayPort specification.

In some embodiments, one or more of the DPCD version, the max link rate value, the max lane count value, the post-link training adjustment value, the enhanced frame cap value, and/or the max downspread value may be different between the first DPCD and the second DPCD. Extraction of the video data by the UFP device 104 and generation of DisplayPort data that includes the video data by the DFP device 124 may be used to compensate for the differences between the first DPCD and the second DPCD.

At block 510, the UFP device 104 begins receiving DisplayPort data from the DP source device 102 as specified by the first DPCD. The DisplayPort data includes video data generated by the DP source device 102 at the bandwidth/ timing negotiated during link training between the UFP device 104 and the DP source device 102.

The method 500 then proceeds to a continuation terminal ("terminal A"). From terminal A (FIG. 5B), the method 500 proceeds to block 512, where the UFP device 104 extracts video data from the DisplayPort data received from the DP source device 102. In some embodiments, the upstream video engine 116 of the UFP device 104 receives the DisplayPort data from the DP source device 102 via the SERDES engine 202. The SERDES engine 202 provides the deserialized DisplayPort data to the decoding engine 204, which decodes the DisplayPort data. The decoded DisplayPort data is provided to the descrambling engine 206, which descrambles the decoded DisplayPort data to obtain the video data.

At block 514, the UFP device 104 transmits the video data to the DFP device 124 via the extension medium 106. In some embodiments, the upstream video engine 116 provides the video data to the extension interface engine 400, which passes the video data through the multiplexing engine 402, the framing engine 404, the MAC engine 406, the XGMII engine 408, the XGXS engine 410, and the SERDES engine 412 to prepare and transmit the video data over the extension medium 106.

At block 516, the DFP device 124 receives the video data via the extension medium. In some embodiments, the extension interface engine 400 of the DFP device 124 receives the data, and processes it via the SERDES engine 412, the XGXS engine 410, the XGMII engine 408, the MAC engine 406, the framing engine 404, and the multiplexing engine 402 in order to reconstitute the video data from the data transmitted across the extension medium 106.

At block 518, the DFP device 124 generates DisplayPort data as specified by the second DPCD that includes the video data. In some embodiments, the scrambling engine 302, encoding engine 304, and SERDES engine 306 of the downstream video engine 134 are used to generate DisplayPort data that includes the video data and that has the number of lanes, the resolution, the bit depth, the refresh rate, the timing, and any other characteristics of the second bandwidth link trained between the DP sink device 122 and the DFP device 124. At block 520, the DFP device 124 transmits the DisplayPort data as specified by the second DPCD to the DP sink device 122.

As illustrated, the method 500 then proceeds to an end block and terminates. Though illustrated as ending at this point for the sake of clarity, the DP source device 102 will typically continue to transmit DisplayPort data to the UFP device 104, which will continue to extract video data and transmit it to the DFP device 124, and the DFP device 124 will continue to generate DisplayPort data including the video data and transmit it to the DP sink device 122.

In some embodiments, either the link between the DP source device 102 and the UFP device 104, the link between the DFP device 124 and the DP sink device 122, or both, may be retrained to a different bandwidth at some point while data transmission is ongoing. In such embodiments, the operation of the UFP device 104 and DFP device 124 should continue seamlessly, as the first bandwidth and the second bandwidth are not required to match at any point. At most, if the link between the DFP device 124 and the DP sink device 122 is retrained to a third bandwidth, the DFP device 124 will generate further DisplayPort data at the third bandwidth instead of the second bandwidth, and the DP source device 102 and UFP device 104 will not require any reconfiguration or link retraining.

While illustrative embodiments have been illustrated and described, it will be appreciated that various changes can be made therein without departing from the spirit and scope of the invention.

What is claimed is:

1. A system for providing DisplayPort communication over an extension medium, the system comprising:
   an extension medium;
   an upstream facing port device (UFP device) communicatively coupled to a DisplayPort source device and the extension medium; and
   a downstream facing port device (DFP device) communicatively coupled to a DisplayPort sink device and the extension medium;
   wherein the UFP device is configured to:
      conduct link training with the DisplayPort source device using first DisplayPort Configuration Data (DPCD), wherein the first DPCD is associated with the DisplayPort source device;
      receive DisplayPort data from the DisplayPort source device as specified by the first DPCD;
      extract video data from the DisplayPort data received from the DisplayPort source device; and
      transmit the video data to the DFP device via the extension medium; and
   wherein the DFP device is configured to:
      conduct link training with the DisplayPort sink device using second DisplayPort configuration data (DPCD), wherein the second DPCD is associated with the DisplayPort sink device;
receive the video data from the UFP device;
generate Display Port data as specified by the second DPCD, wherein the generated Display Port data includes the video data; and
transmit the generated DisplayPort data to the DisplayPort sink device as specified by the second DPCD;
wherein the first DPCD is different from the second DPCD.

2. The system of claim 1, wherein the first DPCD specifies a first max lane count value, and the second DPCD specifies a second max lane count value different from the first max lane count value.

3. The system of claim 1, wherein the first DPCD specifies a first TPS3 support value, and wherein the second DPCD specifies a second TPS3 support value different from the first TPS3 support value, or
wherein the first DPCD specifies a first TPS4 support value, and wherein the second DPCD specifies a second TPS4 support value different from the first TPS4 support value.

4. The system of claim 1, wherein the first DPCD specifies a first DPCD version, and wherein the second DPCD specifies a second DPCD version different from the first DPCD version.

5. The system of claim 1, wherein the first DPCD specifies a first maximum link rate value, and wherein the second DPCD specifies a second maximum link rate value different from the first maximum link rate value.

6. The system of claim 1, wherein the first DPCD specifies a first post-link training adjustment value, and wherein the second DPCD specifies a second post-link training adjustment value different from the first post-link training adjustment value.

7. The system of claim 1, wherein the first DPCD specifies a first enhanced frame cap value, and wherein the second DPCD specifies a second enhanced frame cap value different from the first enhanced frame cap value.

8. The system of claim 1, wherein the first DPCD specifies a first max downspread value, and wherein the second DPCD specifies a second max downspread value different from the first max downspread value.

9. The system of claim 1, wherein the UFP device includes a USB Type-C upstream facing port, and wherein the UFP device is communicatively coupled to the DisplayPort source device via the USB Type-C upstream facing port.

10. The system of claim 1, wherein the UFP device includes a DisplayPort receptacle, and wherein the UFP device is communicatively coupled to the DisplayPort source device via the DisplayPort receptacle.

11. The system of claim 1, wherein the DFP device includes a USB Type-C downstream facing port, and wherein the DFP device is communicatively coupled to the Display Port sink device via the USB Type-C downstream facing port.

12. The system of claim 1, wherein the DFP device includes a DisplayPort receptacle, and wherein the DFP device is communicatively coupled to the DisplayPort sink device via the DisplayPort receptacle.

13. The system of claim 1, wherein extracting video data from the DisplayPort data received from the DisplayPort source device includes:
decoding and unscrambling, by the UFP device, encoded, scrambled video from the DisplayPort data.

14. The system of claim 1, wherein generating DisplayPort data as specified by the second DPCD that includes the video data includes:
encoding and scrambling, by the DFP device, the video data to generate the DisplayPort data.

15. The system of claim 1, further comprising:
a first cable communicatively coupling the UFP device to the DisplayPort source device; and
a second cable communicatively coupling the DFP device to the DisplayPort sink device;
wherein the first cable and the second cable both support communication compliant with at least one DisplayPort standard.

16. A downstream facing port device (DFP device), comprising:
a first interface configured to be communicatively coupled to an extension medium;
a second interface configured to be communicatively coupled to a DisplayPort sink device; and
logic that, in response to execution by the DFP device, causes the DFP device to perform actions comprising:
conducting link training with the DisplayPort sink device using first DisplayPort configuration data (DPCD), wherein the first DPCD is associated with the DisplayPort sink device;
receiving video data via the first interface, wherein the video data is extracted from Display Port data received by an upstream facing port device (UFP device) over a link trained using second DisplayPort configuration data (DPCD);
generating DisplayPort data as specified by the first DPCD, wherein the generated DisplayPort data includes the video data; and
transmitting the DisplayPort data to the DisplayPort sink device as specified by the first DPCD;
wherein the first DPCD is different from the second DPCD.

17. The downstream facing port device of claim 16, wherein the first DPCD and the second DPCD specify one or more different configuration settings, wherein the one or more different configuration settings include one or more of:
a DPCD version;
a max link rate value;
a max lane count value;
a post-link training adjustment value;
a TPS3 support value,
an enhanced frame cap value;
a max downspread value; and
a TPS4 support value.

18. The downstream facing port device of claim 16, wherein the second interface includes at least one of a USB Type-C downstream facing port and a DisplayPort receptacle.

19. A non-transitory computer-readable medium having computer-executable instructions stored thereon that, in response to execution by a downstream facing port device (DFP device), cause the DFP device to perform actions comprising:
conducting link training with the DisplayPort sink device using first DisplayPort configuration data (DPCD), wherein the first DPCD is associated with the DisplayPort sink device;
receiving video data from an extension interface, wherein the video data is extracted from DisplayPort data received by an upstream facing port device (UFP device) over a link trained using second DisplayPort configuration data (DPCD);

generating DisplayPort data as specified by the first DPCD, wherein the generated DisplayPort data includes the video data; and transmitting the DisplayPort data to the DisplayPort sink device as specified by the first DPCD;

wherein the first DPCD is different from the second DPCD.

20. The non-transitory computer-readable medium of claim 19, wherein the first DPCD and the second DPCD specify one or more different configuration settings, wherein the one or more different configuration settings include one or more of:

a DPCD version;
a max link rate value;
a max lane count value;
a post-link training adjustment value;
a TPS3 support value;
an enhanced frame cap value;
a max downspread value; and
a TPS4 support value.

* * * * *